(12) United States Patent
Corella et al.

(10) Patent No.: US 7,830,499 B1
(45) Date of Patent: Nov. 9, 2010

(54) METHOD AND APPARATUS FOR LASER RETURN CHARACTERIZATION IN A COUNTERMEASURES SYSTEM

(76) Inventors: Armando Corella, 1115 Lakeview Ter., Azusa, CA (US) 91702; John A. Carattini, 3326 Delancey Ct., Chino Hills, CA (US) 91709

( * ) Notice: Subject to any disclaimer, the term of this patent is extended or adjusted under 35 U.S.C. 154(b) by 0 days.

(21) Appl. No.: 12/080,157

(22) Filed: Mar. 31, 2008

Related U.S. Application Data

(60) Provisional application No. 60/920,713, filed on Mar. 29, 2007.

(51) Int. Cl.
  G01C 3/08 (2006.01)
  G01P 3/36 (2006.01)
(52) U.S. Cl. ........................................ 356/4.01; 356/28
(58) Field of Classification Search ....... 356/4.01–5.01, 356/28; 342/14; 398/39
  See application file for complete search history.

(56) References Cited

U.S. PATENT DOCUMENTS

| | | | |
|---|---|---|---|
| 6,343,766 B1 * | 2/2002 | Livingston | 244/3.13 |
| 6,359,681 B1 * | 3/2002 | Housand et al. | 356/4.01 |
| 6,643,000 B2 | 11/2003 | Fluckiger | |
| 6,992,778 B2 | 1/2006 | Nahum | |
| 7,378,626 B2 * | 5/2008 | Fetterly | 244/3.1 |
| 7,492,308 B2 * | 2/2009 | Benayahu et al. | 342/52 |
| 2004/0004707 A1 | 1/2004 | DeFlumere | |
| 2006/0197938 A1 | 9/2006 | Halmos et al. | |
| 2006/0232760 A1 | 10/2006 | Asbrock et al. | |
| 2007/0076481 A1 | 4/2007 | Tennant | |
| 2007/0201015 A1 * | 8/2007 | Gidseg et al. | 356/29 |
| 2007/0206177 A1 * | 9/2007 | Anschel et al. | 356/28 |

\* cited by examiner

*Primary Examiner*—Isam Alsomiri

(57) ABSTRACT

A method for laser return characterization in a DIRCM system, wherein the improvement comprises the step of using a split or shared path.

1 Claim, 1 Drawing Sheet

METHOD AND APPARATUS FOR LASER RETURN CHARACTERIZATION IN A COUNTERMEASURES SYSTEM

CROSS REFERENCE TO RELATED APPLICATION

This application claims rights under 35 USC §119(e) from U.S. patent application Ser. No. 60/920,713 filed Mar. 29, 2007, the contents of which are incorporated herein by reference.

BACKGROUND OF THE INVENTION

1. Field of the Invention

The present invention relates to countermeasures systems and more particularly to methods for laser characterization in directed infrared countermeasures (DIRCM) systems.

2. Brief Description of Prior Developments

Countermeasures Effectiveness Assessment (CMEA) has been a major priority in the development of Directed Infrared Countermeasures (DIRCM) systems. The determination of when a threat is no longer lethal is a priority during multiple launches. The classification of threat helps with determining of jam code algorithms selection or allows provisos for alternate deterrents. Conventional approaches use the existing fine-track-sensor, IR imaging camera, to detect jam-laser optical return. Disadvantages of such conventional approaches may include the need for additional processing, camera blanking, long integration times, lack of camera sensitivity, and asynchronous returns.

SUMMARY OF INVENTION

The present invention is a method and apparatus for laser return characterization in a DIRCM system, wherein the improvement comprises the step of using a split or shared path.

BRIEF DESCRIPTION OF THE DRAWINGS

The present invention is further defined with reference to the accompanying drawing where.

DETAILED DESCRIPTION OF THE PREFERRED EMBODIMENT

Referring to FIG. 1, the method of the present invention can be accomplished with slit or shared path. A single detector is added and dedicated to collect laser returns. The detector must be mounted on final stage of the gimbal. The response must be able to receive laser pulses with reticule information, assuming μsec. This unburdens the track camera from additional processing or limitations of integration time. Since the single detector becomes a background staring sensor the device can also be used to measure background noise to help with camera's AGC.

In this invention the correlating laser fire event with return time provides rangefinding data an added feature that will help in determination of the specific threat. The wavelength of the detector must be wide-band to enable correlation of missile types similar to PbSe.

Figure 1B:
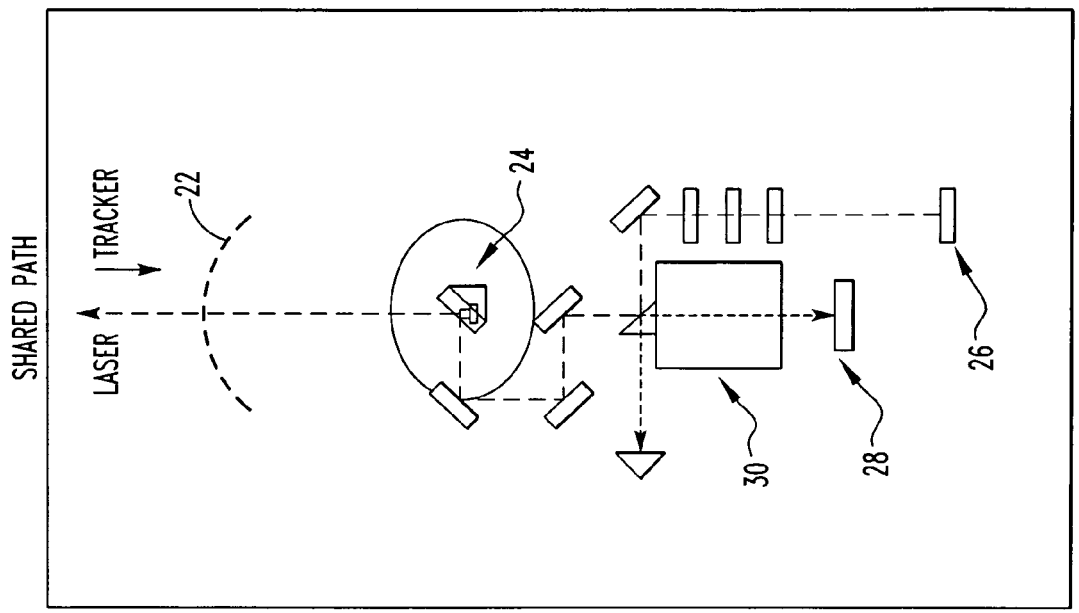
FIGS. 1A and 1B are respectively vertical cross section schematic view of a preferred split path and shared path embodiment of the apparatus of the present invention.
Figure 1A:
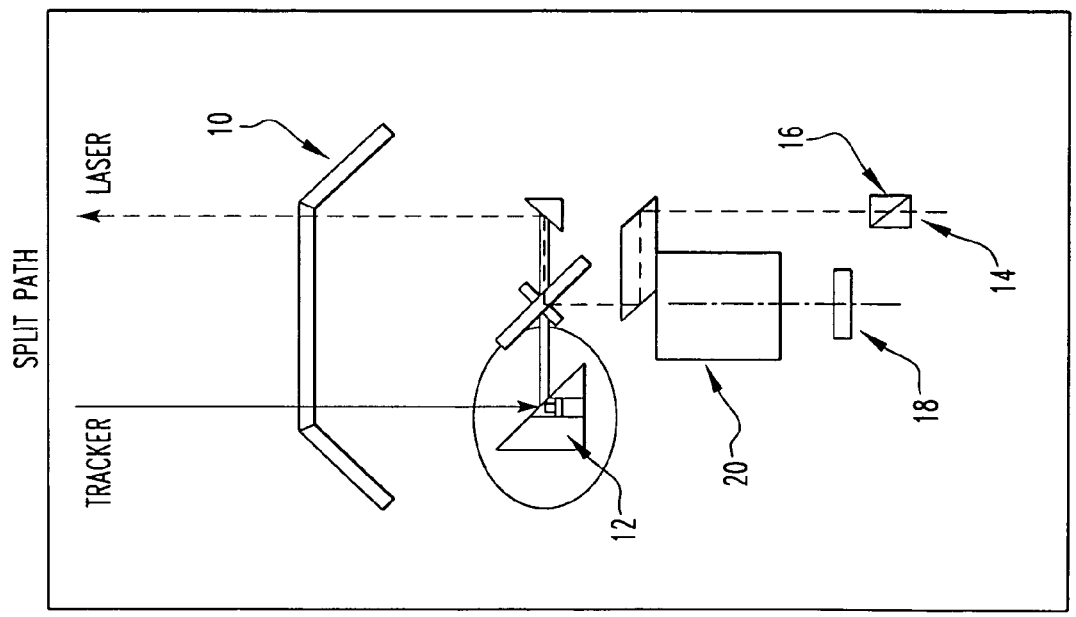

Referring to FIG. 1A, in the split path embodiment, there is a dome 10 and an embedded detector 12. There is also a laser beam entrance point 14, a beam combiner 16, a TDA 18, and a TOA 20.

Referring to FIG. 1B, there is a dome 22 and an embedded detector 24, there is also a laser beam entrance port 26, a TDA 28 and a TOA 30.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a method for laser return characterization in a DIRCM system, wherein the improvement comprises the steps of using a track camera having an embedded single detector, and a split or shared path between the laser and the track camera and embedded detector, the track camera being mounted on a gimbal and dedicated to collect laser returns so as to unburden the track camera from additional processing or from limitations of integration time, the embedded single detector functioning as a background staring sensor to measure background noise used to adjust the gain of the track camera.

* * * * *